United States Patent
Zelesky et al.

(10) Patent No.: US 10,513,932 B2
(45) Date of Patent: Dec. 24, 2019

(54) COOLING PEDESTAL ARRAY

(71) Applicant: United Technologies Corporation, Farmington, CT (US)

(72) Inventors: Mark F. Zelesky, Bolton, CT (US); Eleanor D. Kaufman, Cromwell, CT (US)

(73) Assignee: United Technologies Corporation, Farmington, CT (US)

( * ) Notice: Subject to any disclaimer, the term of this patent is extended or adjusted under 35 U.S.C. 154(b) by 651 days.

(21) Appl. No.: 15/200,063

(22) Filed: Jul. 1, 2016

(65) Prior Publication Data
US 2016/0312623 A1  Oct. 27, 2016

Related U.S. Application Data

(62) Division of application No. 13/418,854, filed on Mar. 13, 2012, now abandoned.

(51) Int. Cl.
*F01D 5/18* (2006.01)
*F01D 9/04* (2006.01)
(Continued)

(52) U.S. Cl.
CPC ............. *F01D 5/187* (2013.01); *F01D 5/186* (2013.01); *F01D 9/041* (2013.01); *F01D 25/12* (2013.01);
(Continued)

(58) Field of Classification Search
CPC . F01D 5/18; F01D 5/186; F01D 5/187; F01D 25/12; F05D 2240/81
See application file for complete search history.

(56) References Cited

U.S. PATENT DOCUMENTS 4,180,373 A  12/1979 Moore et al.
5,738,493 A   4/1998 Lee et al.
(Continued)

FOREIGN PATENT DOCUMENTS

EP  1533475 A2  5/2005
EP  1544413 A2  6/2005
JP  2009041433 A  2/2009

OTHER PUBLICATIONS

International Search Report and Written Opinion from PCT Application Serial No. PCT/US2013/025864, dated May 29, 2013, 14 pages.
(Continued)

*Primary Examiner* — Steven M Sutherland
*Assistant Examiner* — Thuyhang N Nguyen
(74) *Attorney, Agent, or Firm* — Kinney & Lange, P.A.

(57) ABSTRACT

A turbine engine airfoil includes a first surface to be cooled by a flow of cooling air. The first surface includes a pedestal array and a first row of contour bumps. The pedestal array includes first and second rows of pedestals extending from the first surface. The second row of pedestals runs in a direction generally parallel to the first row of pedestals. The first row of contour bumps extends from the first surface between the first row of pedestals and the second row of pedestals and runs parallel to the first row of pedestals. The first row of contour bumps is aligned such that at least one of the contour bumps of the first row of contour bumps is positioned at least one of immediately downstream of a pedestal of the first row of pedestals and immediately upstream of a pedestal of the second row of pedestals.

18 Claims, 8 Drawing Sheets

(51) Int. Cl.
 *F01D 25/12* (2006.01)
 *F02C 3/10* (2006.01)
(52) U.S. Cl.
 CPC ............ *F02C 3/10* (2013.01); *F05D 2220/32* (2013.01); *F05D 2240/81* (2013.01); *F05D 2260/202* (2013.01); *F05D 2260/22141* (2013.01)

(56) References Cited

U.S. PATENT DOCUMENTS

| | | | |
|---|---|---|---|
| 6,179,565 B1 | 1/2001 | Palumbo et al. | |
| 6,254,334 B1 * | 7/2001 | LaFleur | F01D 5/186 415/115 |
| 6,808,367 B1 | 10/2004 | Liang | |
| 6,896,487 B2 | 5/2005 | Cunha et al. | |
| 6,929,451 B2 * | 8/2005 | Gregg | F01D 5/16 416/500 |
| 6,984,102 B2 | 1/2006 | Bunker et al. | |
| 7,278,463 B2 | 10/2007 | Snyder et al. | |
| 7,438,527 B2 | 10/2008 | Albert et al. | |
| 7,713,027 B2 | 5/2010 | Cherolis et al. | |
| 7,731,481 B2 | 6/2010 | Cunha et al. | |
| 7,775,053 B2 | 8/2010 | Joe et al. | |
| 8,083,485 B2 | 12/2011 | Chon et al. | |
| 2008/0019840 A1 | 1/2008 | Cunha | |
| 2008/0095636 A1 | 4/2008 | Cherolis et al. | |
| 2009/0060715 A1 | 3/2009 | Kopmels | |
| 2010/0119372 A1 | 5/2010 | Gage et al. | |

OTHER PUBLICATIONS

Extended European Search Report for EP Application No. 13760940.0, dated Dec. 18, 2015, 8 pages.

Examination Report for European Application No. 13760940.0 dated Apr. 3, 2019, 7 pages.

* cited by examiner

COOLING PEDESTAL ARRAY

CROSS-REFERENCE TO RELATED APPLICATION(S)

This application is a divisional filed pursuant to 35 U.S.C. § 121 of U.S. application Ser. No. 13/418,854 filed Mar. 13, 2012 for "COOLING PEDESTAL ARRAY" by Mark F. Zelesky and Eleanor D. Kaufman.

BACKGROUND

The present invention relates to turbine engines. In particular, the invention relates to cooling channel pedestal arrays for a turbine engine.

A turbine engine employs a series of turbine stages to extract energy from a flow of combustion gases to perform useful work. Turbine stages include airfoils, for example, stator vanes and rotor blades; and shroud components to contain the flow of combustion gases, for example, blade outer air seals, rotor blade platforms, and stator vane platforms. These turbine stage components are directly exposed to the flow of combustion gases and must survive in a high-temperature environment. Often, portions of airfoils or shrouds exposed to high temperatures are hollow, having internal cooling channels that direct a flow of cooling air through the airfoil or shroud to remove heat and prolong the useful life of the component.

A source of cooling air is typically taken from a flow of compressed air produced upstream of the turbine stages. Some of the energy extracted from the flow of combustion gases must be used to provide the compressed air, thus reducing the energy available to do useful work and reducing an overall efficiency of the turbine engine.

Internal cooling channels are designed to provide efficient transfer of heat between the component to be cooled and the flow of cooling air within. As heat transfer efficiency improves, less cooling air is necessary to adequately cool the component. Internal cooling channels typically include structures to improve heat transfer efficiency including, for example, pedestals (also known as pin fins). Pedestals may link opposing sides of the internal cooling channel and improve heat transfer by increasing both the area for heat transfer and the turbulence of the cooling air flow.

While the use of pedestals in internal cooling channels improves heat transfer efficiency between turbine engine components exposed to a flow of combustion gases, further improvement in the heat transfer efficiency of pedestal arrays can improve overall turbine engine efficiency.

SUMMARY

An embodiment of the present invention is a turbine engine rotor blade including a first surface to be cooled by a flow of cooling air, the first surface including a pedestal array and a first row of contour bumps. The pedestal array is physically connected to the first surface and includes a first row of pedestals extending from the first surface and a second row of pedestals extending from the first surface. The second row of pedestals runs in a direction generally parallel to the first row of pedestals. The first row of contour bumps extends from the first surface between the first row of pedestals and the second row of pedestals. The first row of contour bumps runs in a direction generally parallel to the first row of pedestals. The first row of contour bumps is aligned such that at least one of the contour bumps of the first row of contour bumps is positioned at least one of immediately downstream of a pedestal of the first row of pedestals and immediately upstream of a pedestal of the second row of pedestals.

Another embodiment of the present invention is a gas turbine engine including a combustor and a turbine. The turbine includes a plurality of rotor stages, a plurality of stator stages interspersed between the plurality of rotor stages, and a rotor blade to be cooled within at least one of the combustor and the turbine. The rotor blade includes a first surface to be cooled by a flow of cooling air, the first surface including a pedestal array and a first row of contour bumps. The pedestal array is physically connected the first surface and includes a first row of pedestals extending from the first surface and a second row of pedestals extending from the first surface. The second row of pedestals runs in a direction generally parallel to the first row of pedestals. The first row of contour bumps extends from the first surface between the first row of pedestals and the second row of pedestals. The first row of contour bumps runs in a direction generally parallel to the first row of pedestals. The first row of contour bumps is aligned such that at least one of the contour bumps of the first row of contour bumps is positioned at least one of immediately downstream of a pedestal of the first row of pedestals and immediately upstream of a pedestal of the second row of pedestals.

Another embodiment of the present invention is a turbine engine rotor blade including a first surface to be cooled by a flow of cooling air, the first surface including a pedestal array and a first row of contour bumps. The pedestal array is physically connected the first surface and includes a first row of pedestals extending from the first surface and a second row of pedestals extending from the first surface. The second row of pedestals runs in a direction generally parallel to the first row of pedestals. The first row of contour bumps extends from the first surface between the first row of pedestals and the second row of pedestals. The first row of contour bumps runs in a direction generally parallel to the first row of pedestals. Contour bumps of the first row of contour bumps have a shape that is one of an ellipsoidal dome, a tear drop, and a bulb tapered at both ends.

A method for cooling a surface within an internal cooling channel includes introducing cooling air into a pedestal array on the surface to be cooled, then flowing the cooling air between adjacent pedestals of a first row of pedestals attached to the surface. Next, flowing the cooling air over and between adjacent contour bumps of a row of contour bumps beyond the first row of pedestals. Finally, flowing the cooling air between adjacent pedestals of a second row of pedestals attached to the surface beyond the row of contour bumps. Flowing the cooling air over and between adjacent contour bumps includes at least one of increasing heat transfer in a separation zone by flowing cooling air over contour bumps aligned immediately downstream of the first row of pedestals, and compensating for a lack of blocking in a downstream channel region by flowing cooling air over contour bumps aligned immediately upstream of a pedestal of the second row of pedestals.

DETAILED DESCRIPTION

The present invention provides for improved heat transfer efficiency between turbine engine components exposed to a flow of combustion gases by employing pedestal arrays with contoured endwall surfaces. Rows of contour bumps are disposed between rows of pedestals on the surface to be cooled, also known as the endwall surface. The contour bumps improve heat transfer efficiency when compared to a flat surface by increasing the surface area available for heat transfer and by forcing an increase in the velocity of cooling air passing over the surface between pedestal rows, thus increasing the convective heat transfer coefficient. In some embodiments, positioning contour bumps immediately downstream of pedestals increases heat transfer in the separation zone. In some embodiments, positioning contour bumps downstream and in the channel between pedestals compensates for a lack of blocking in the downstream channel. Contour bumps of various shapes may be employed in some embodiments to further enhance heat transfer efficiency.

Figure 1:
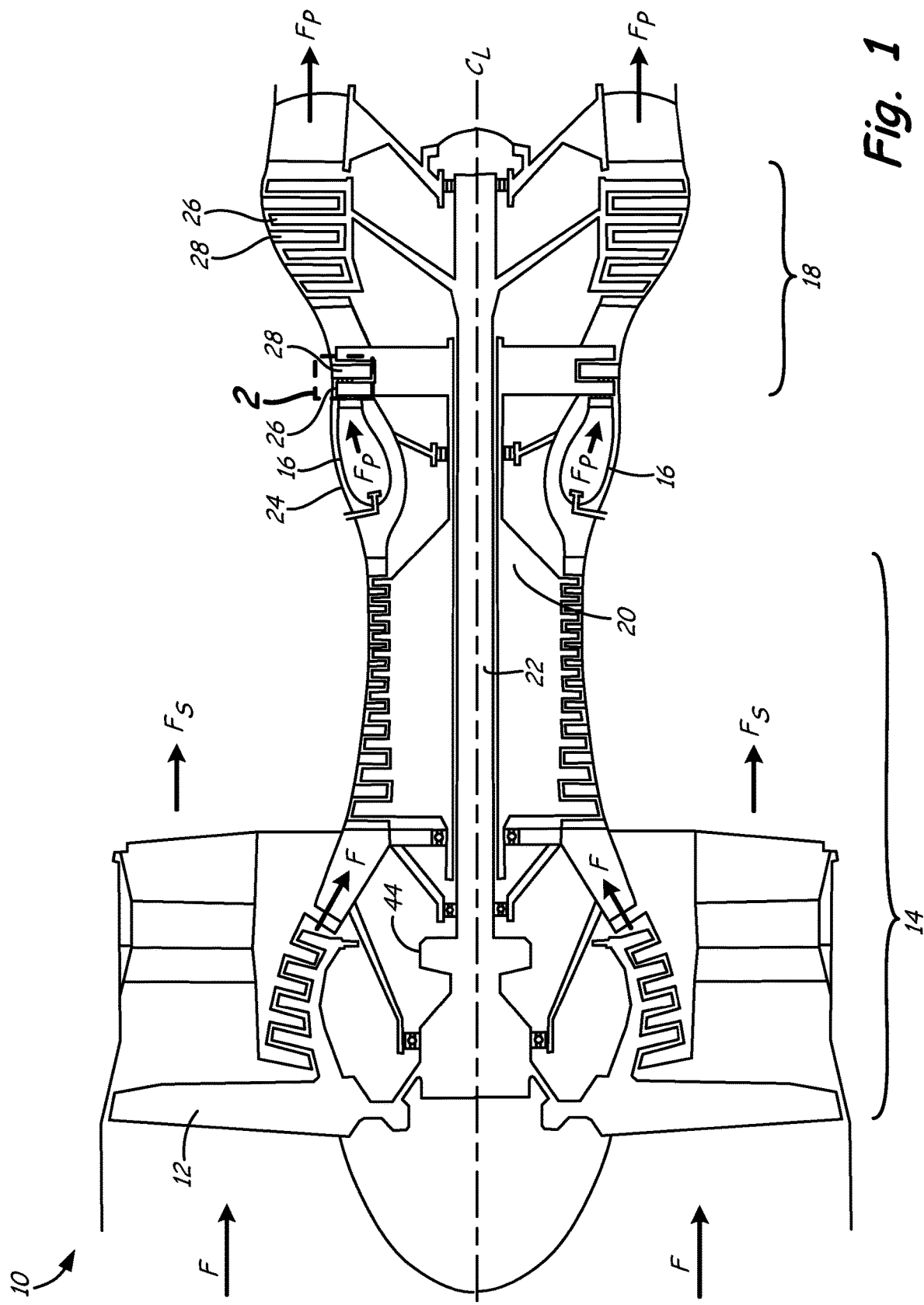
FIG. 1 is a sectional view of gas turbine engine embodying an improved cooling pedestal array of the present invention.

FIG. 1 is a representative illustration of a gas turbine engine including pedestal arrays with contoured endwall surfaces embodying the present invention. The view in FIG. 1 is a longitudinal sectional view along an engine center line. FIG. 1 shows gas turbine engine 10 including fan 12, compressor 14, combustor 16, turbine 18, high-pressure rotor 20, low-pressure rotor 22, and engine casing 24. Turbine 18 includes rotor stages 26 and stator stages 28.

As illustrated in FIG. 1, fan 12 is positioned along engine center line ($C_L$) at one end of gas turbine engine 10. Compressor 14 is adjacent fan 12 along engine center line $C_L$, followed by combustor 16. Turbine 18 is located adjacent combustor 16, opposite compressor 14. High-pressure rotor 20 and low-pressure rotor 22 are mounted for rotation about engine center line $C_L$. High-pressure rotor 20 connects a high-pressure section of turbine 18 to compressor 14. Low-pressure rotor 22 connects a low-pressure section of turbine 18 to fan 12. Rotor stages 26 and stator stages 28 are arranged throughout turbine 18 in alternating rows. Rotor stages 26 connect to high-pressure rotor 20 and low-pressure rotor 22. Engine casing 24 surrounds turbine engine 10 providing structural support for compressor 14, combustor 16, and turbine 18, as well as containment for cooling air flows, as described below.

In operation, air flow F enters compressor 14 through fan 12. Air flow F is compressed by the rotation of compressor 14 driven by high-pressure rotor 20. The compressed air from compressor 14 is divided, with a portion going to combustor 16, and a portion employed for cooling components exposed to high-temperature combustion gases, such as stator vanes, as described below. Compressed air and fuel are mixed an ignited in combustor 16 to produce high-temperature, high-pressure combustion gases Fp. Combustion gases Fp exit combustor section 16 into turbine section 18. Stator stages 28 properly align the flow of combustion gases Fp for an efficient attack angle on subsequent rotor stages 26. The flow of combustion gases Fp past rotor stages 26 drives rotation of both high-pressure rotor 20 and low-pressure rotor 22. High-pressure rotor 20 drives compressor section 14, as noted above, and low-pressure rotor 22 drives fan 12 to produce thrust Fs from gas turbine engine 10.

Figure 2:
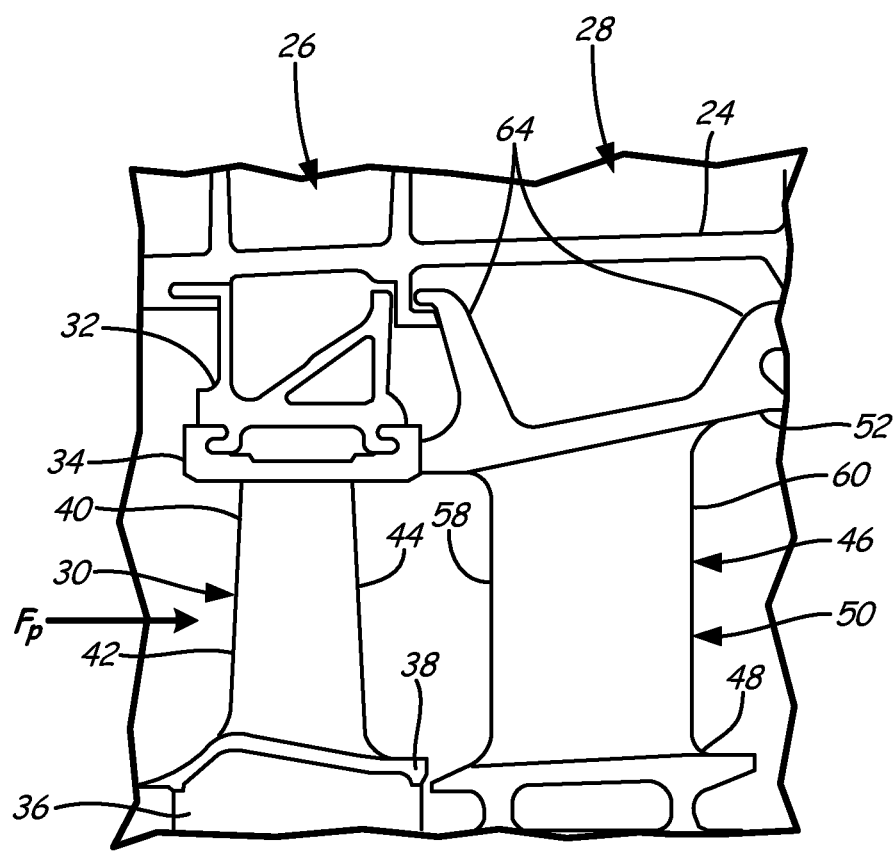
FIG. 2 is an enlarged view of a turbine portion of the gas turbine engine shown in FIG. 1.

FIG. 2 is an enlarged view of a turbine portion of the gas turbine engine shown in FIG. 1. FIG. 2 illustrates rotor stage 26 and stator stage 28. Rotor stage 26 includes rotor blade 30, blade outer air seal (BOAS) support 32, and BOAS 34. Rotor blade 30 includes blade root 36, blade platform 38, and blade airfoil 40. Blade platform 38 is arcuate in shape in a circumferential direction with a center of the arc coincident with engine center line $C_L$. Blade airfoil 40 has a leading edge 42 and a trailing edge 44. Rotor stage 26 connects to high-pressure rotor 20 by blade root 36. Platform 38 connects blade airfoil 40 to blade root 36 such that leading edge 42 faces the upstream flow of combustion gases Fp and trailing edge 44 faces the downstream flow of combustion gases Fp. BOAS 34 is positioned radially outward from rotor blade 30, with respect to engine center line $C_L$ as shown in FIG. 1. BOAS 34 is held in position by BOAS support 32, which is connected to engine casing 24.

Stator stage 28 includes stator vane 46, vane inside diameter (ID) platform 48, vane airfoil 50, and vane outside diameter (OD) platform 52. Like blade platform 38, vane ID platform 48 and vane OD platform 52 are arcuate in shape in a circumferential direction with a center of the arc coincident with engine center line $C_L$. Vane airfoil 50 also has a leading edge 58 and a trailing edge 60. Vane OD platform 52 includes vane mounting hooks 64. Stator stage 28 connects to engine casing 24 by vane mounting hooks 64 of vane OD platform 52. Vane airfoil 50 connects at a radially outer end to vane OD platform 52 and at a radially inner end to vane ID platform 48.

In operation, as the flow of combustion gases Fp passes through turbine section 18, it enters rotor stage 26 and is channeled between blade platform 38 and BOAS 34. Within rotor stage 26, the flow of combustion gases Fp impinges upon blade airfoil 40 causing rotor blade 30 to rotate about engine center line $C_L$. BOAS 34 is mounted just radially outward from rotor blade 30 and also provides a seal against combustion gases Fp radially bypassing blade airfoil 40. The flow of combustion gases Fp exits rotor stage 26 and enters stator stage 28, where it is channeled between vane ID platform 48 and vane OD platform 52. Within stator stage 28, the flow of combustion gases impinges upon vane airfoil 50 and is thus aligned for a subsequent rotor stage (not shown).

Components operating downstream of combustor 16, such as blade platform 38, blade airfoil 40, BOAS 34, vane ID platform 48, vane airfoil 50, and vane OD platform 52, operate in a high-temperature environment. Often, such components exposed to high temperatures have internal cooling channels that direct a flow of cooling air through the component to remove heat and prolong its useful life.

Figure 3:
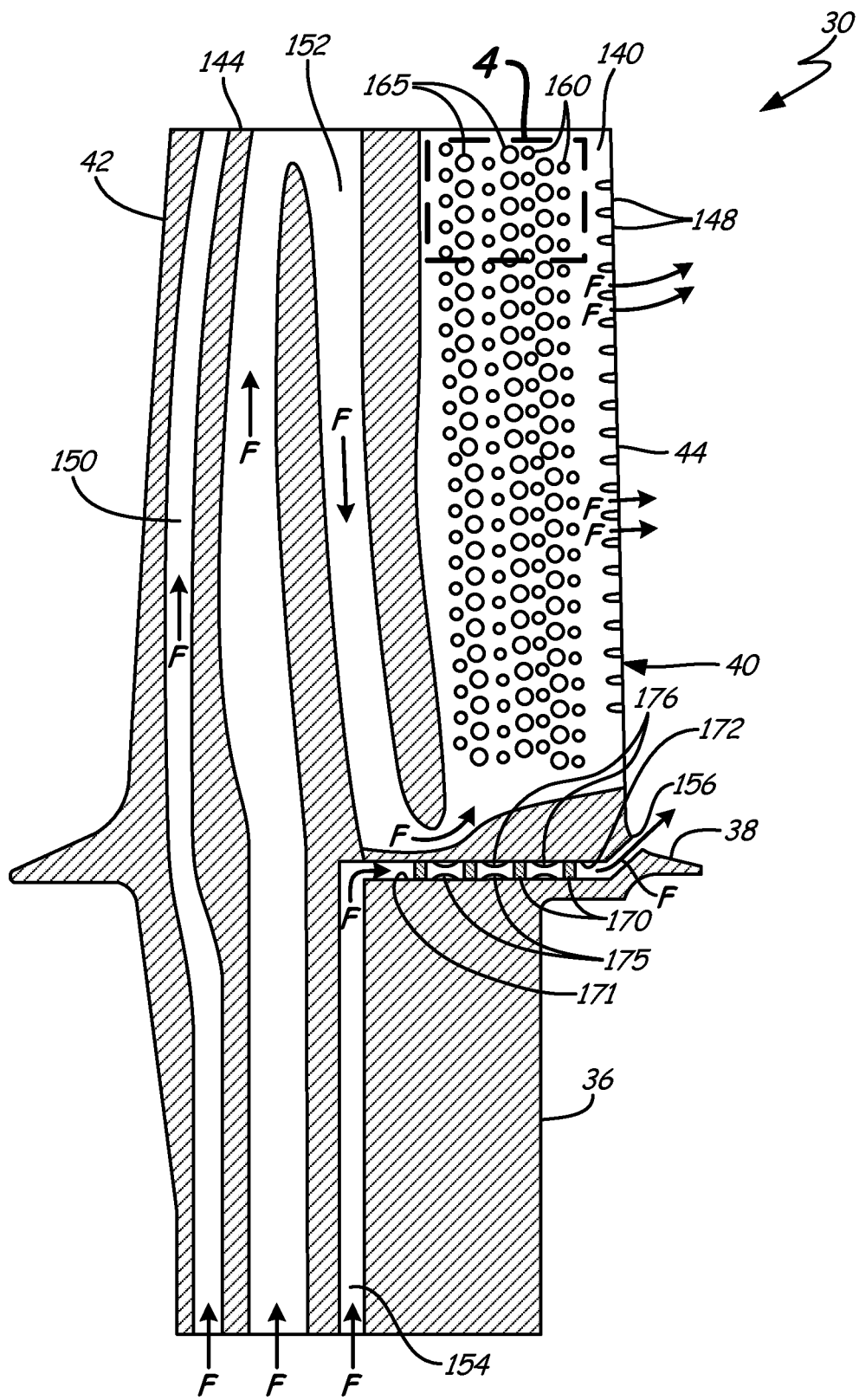
FIG. 3 is a cutaway side view of a turbine rotor blade embodying improved cooling pedestal arrays of the present invention.

FIG. 3 is a cutaway side view of turbine rotor blade 30 employed in rotor stages 26 of gas turbine engine 10. FIG. 3 shows rotor blade 30 with two internal cooling channels, each with internal cooling channel pedestal arrays with contoured endwall surfaces embodying the present invention. Airfoil section 40 further includes pressure side 140, tip 144, and trailing edge cooling slots 148. Airfoil section 40 also further includes suction side wall 142 (removed in this cutaway view) and a plurality of surface cooling holes such as film cooling holes (not shown). As shown in FIG. 3, platform 38 includes trailing edge cooling slot 156.

Platform 38 connects one end of airfoil section 40 to root section 36. Thus, leading edge 42, trailing edge 44, pressure side wall 140, and suction side wall 142 extend from platform 38. Tip 144 closes off the other end of airfoil section 40. Pressure side wall 140 and suction side wall 142 connect leading edge 42 and trailing edge 44. Trailing edge slots 148 are arranged along trailing edge 44 to provide an exit for cooling air circulating within airfoil section 40. Trailing edge slot 156 is arranged along platform 38 to provide an exit for air circulating within platform 38.

As shown in FIG. 3, rotor blade 30 includes three internal cooling channels, leading edge channel 150, trailing edge cooling channel 152, and platform cooling channel 154. Trailing edge cooling channel 152 includes pedestal array 160. Platform cooling channel 154 includes pedestal array 170. Leading edge channel 150 and trailing edge cooling channel 152 extend from root section 36, through platform 38, into airfoil section 40. Film cooling holes (not shown) near leading edge 42 are in fluid communication with leading edge channel 150. The balance of film cooling holes (not shown) and trailing edge slots 148 are in fluid communication with trailing edge cooling channel 152. Platform cooling channel 154 extends from root section 36 into platform 38. Trailing edge slot 156 is in fluid communication with platform cooling channel 154.

Airfoil 40 is cooled by flow of cooling air F entering leading edge channel 150 and trailing edge cooling channel 152 at root 36. Flow of cooling air F entering leading edge channel 150 internally cools a portion of airfoil 40 near leading edge 42 before flowing out through film cooling holes near leading edge 42. In one embodiment of the present invention, flow of cooling air F entering trailing edge cooling channel 152 internally cools a remaining portion of airfoil 40 before flowing out through the balance of the film cooling holes and trailing edge slots 148. As trailing edge cooling channel 152 nears trailing edge 44, flow of cooling air F impinges on pedestal array 160. Pedestal array 160 provides increased surface area for heat transfer from airfoil 40 to flow of cooling air F, compared to portions of trailing edge cooling channel 152 that do not contain pedestal array 160. In addition, pedestal array 160 creates turbulence in flow of cooling air F to increase convective heat transfer. FIG. 3 also shows pressure side wall 140 in the region of pedestal array 160 includes rows of contour bumps 165 to form contoured endwall surfaces to improve heat transfer efficiency within pedestal array 160 as described below in reference to FIGS. 4, 5A, and 5B.

Platform 38 is cooled by flow of cooling air F entering platform cooling channel 154 at root 36. Flow of cooling air F enters platform cooling channel 154 and internally cools platform 38 before flowing out through trailing edge slot 156. As platform cooling channel 154 enters platform 38, flow of cooling air F impinges on pedestal array 170. Pedestals of pedestal array 170 connect a first surface 171 to be cooled to a second surface 172 to be cooled. First surface 171 is opposite second surface 172 to form platform cooling channel 154 within platform 38. In another embodiment of the present invention, FIG. 3 also shows that platform cooling channel 154 in the region of pedestal array 170 includes a plurality of rows of contour bumps 175 on first surface 171 and a plurality of rows of contour bumps 176 on second surface 172 opposite first surface 171. Together, rows of contour bumps 175 on first surface 171 and rows of contour bumps 176 on second surface 172 form contoured endwall surfaces for pedestal array 170 to improve heat transfer efficiency within pedestal array 170 as described below in reference to FIGS. 6, 7A, and 7B.

Figure 4:
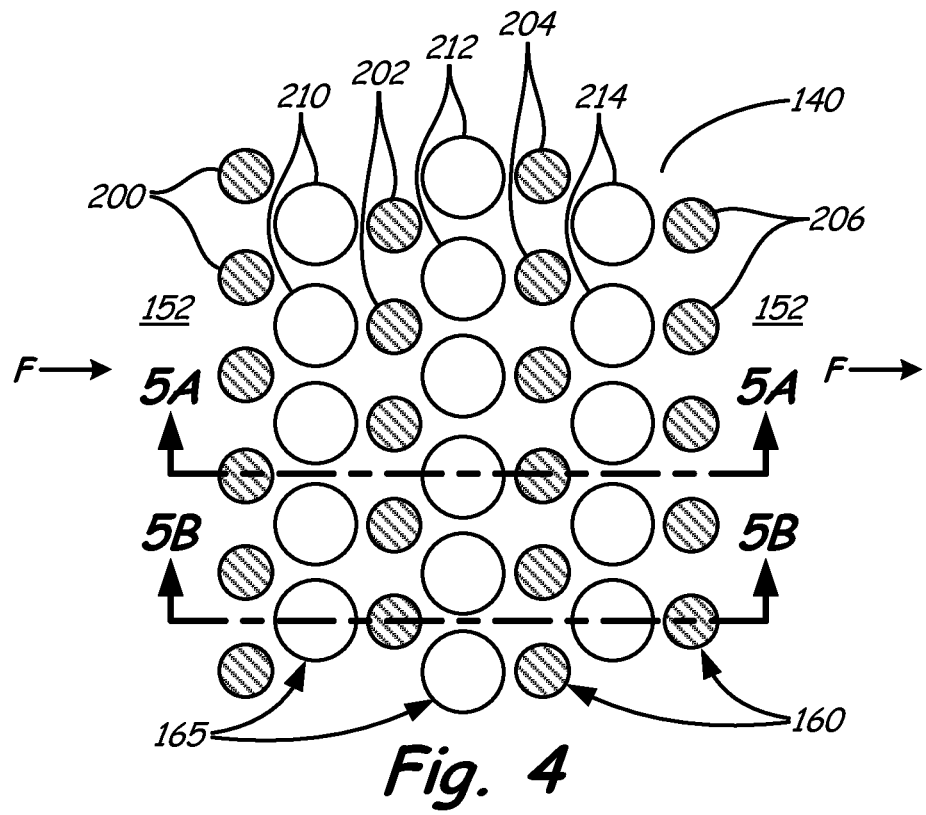
FIG. 4 is an enlarged cutaway side view of a portion of the turbine rotor blade of FIG. 3 illustrating an embodiment of improved cooling pedestal arrays of the present invention.

FIG. 4 is an enlarged cutaway side view of a portion of an airfoil component, airfoil 40 of rotor blade 30 of FIG. 3 illustrating an embodiment of improved cooling pedestal arrays of the present invention. FIG. 4 shows a first surface, pressure side wall 140, to be cooled by flow of cooling air F flowing through trailing edge cooling channel 152. Pressure side wall 140 includes rows of contour bumps 165 including first row of contour bumps 210. Pedestal array 160 includes first row of pedestals 200 and second row of pedestals 202. Second row of pedestals 202 runs in a direction generally parallel to first row of pedestals 200. First row of contour bumps 210 extends from pressure side wall 140 between first row of pedestals 200 and second row of pedestals 202 and runs in a direction generally parallel to first row of pedestals 200. Second row of pedestals 202 is offset from first row of pedestals 200 in the parallel direction by one-half of a pitch of first row of pedestals 200. In this embodiment, first row of contour bumps 210 is also offset from first row of pedestals 200 in the parallel direction by one-half of the pitch of first row of pedestals 200, such that at least one contour bump of first row of contour bumps 210 is positioned immediately upstream of a pedestal of second row of pedestals 202.

The pattern described above continues throughout pedestal array 160 such that additional rows of pedestals (e.g., 204, 206) run in a direction generally parallel to second row of pedestals 202 opposite first row of pedestals 200, each of the rows of pedestals offset from an adjacent row of pedestals by one-half of a pitch of the adjacent row of pedestals. Each additional row of contour bumps (e.g., 212, 214) runs between adjacent rows of pedestals and is aligned co-linear with a row of pedestals immediately downstream (e.g., 204, 206).

Figure 5A:
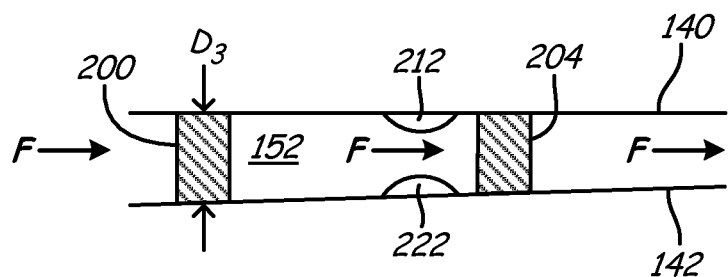
FIGS. 5A and 5B are side cross-sectional views of portions of the improved cooling pedestal array embodiment of FIG. 4.
Figure 5B:
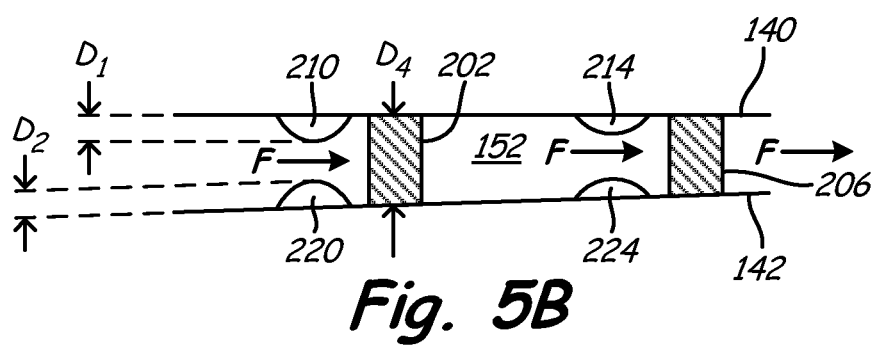

FIGS. 5A and 5B are side cross-sectional views of portions of the improved cooling pedestal array embodiment of FIG. 4. FIGS. 5A and 5B each illustrate an aspect of the pattern shown in FIG. 4. The sectional view of FIGS. 5A and 5B show the first surface to be cooled, pressure side wall 140 is opposite the second surface to be cooled, suction side wall 142, forming trailing edge cooling channel 152. Pedestals in pedestal array 160, including those in first row of pedestals 200 and second row of pedestals 202 extend from pressure side wall 140 to suction side wall 142, connecting the two endwalls. First row of contour bumps 210 extends first distance D1 into trailing edge cooling channel 152 from pressure side wall 140. As shown in FIG. 5B, suction side wall 142 includes second row of contour bumps 220. Second row of contour bumps 220 extends second distance D2 into trailing edge cooling channel 152 from suction side wall 142. Second row of contour bumps 220 is also positioned directly across trailing edge cooling channel 152 from first row of contour bumps 210. In some embodiments, first distance D1 and second D2 will be approximately equal.

Similarly, first row of pedestals 200 extends third distance D3 and second row of pedestals 202 extends fourth distance D4 across trailing edge cooling channel 152, and, in some embodiments, third distance D3 and fourth distance D4 will be approximately equal. However, in this embodiment, trailing edge cooling channel 152 does not have a constant width. A distance each row of pedestals extends between pressure side wall 140 and suction side wall 142 decreases along the flow path. Thus, third distance D3 is greater than fourth distance D4. In this embodiment, a distance each row of contour bumps extends from pressure side wall 140 or suction side wall 142 also decreases along the flow path to maintain heat transfer efficiency between surfaces to be cooled, pressure side wall 140 and suction side wall 142, and flow of cooling air F. This pattern continues down the line such that subsequent rows of pedestals (e.g., 204, 206) extend decreasing distances across trailing edge cooling channel 152 and subsequent rows of contour bumps (e.g. 212, 222, 214, 224) extend decreasing distances into trailing edge cooling channel 152.

Considering FIGS. 4, 5A, and 5B together, in operation, flow of cooling air F flows around and between each of the pedestals in first row of pedestals 200. The flow constriction created by adjacent pedestals in first row of pedestals 200 increases the velocity of flow of cooling air F. In addition, as flow of cooling air F recombines on a downstream side of each of the pedestals in first row of pedestals 200, turbulence is created. These two effects combine to increase the convective heat transfer coefficient. Once past first row of pedestals 200, flow of cooling air F flows around, between, and over first row of contour bumps 210 and second row of contour bumps 220. First row of contour bumps 210 and second row of contour bumps 220 increase surface areas of pressure side wall 140 and suction side wall 142, respectively, in a region between first row of pedestals 200 and second row of pedestals 202. In addition, first row of contour bumps 210 and second row of contour bumps 220 decrease the cross-sectional area through which flow of cooling air F passes, resulting in a higher velocity of flow of cooling air F, compared to a flat surface without contour bumps. The higher velocity of flow of cooling air F produces a corresponding increase in the heat transfer coefficient. These two effects provided by first row of contour bumps 210 and second row of contour bumps 220 combine to increase the heat transfer efficiency between surfaces to be cooled, pressure side wall 140 and suction side wall 142, and flow of cooling air F, compared to a flat surface without contour bumps.

As noted above, first row of contour bumps 210 and second row of contour bumps 220 decrease the cross-sectional area through which flow of cooling air F passes. The extent to which first row of contour bumps 210 and second row of contour bumps 220 extend into trailing edge cooling channel 152 influences this greatly. For example, in an embodiment where first distance D1 and second distance D2 extend such that together, they narrow portions of trailing edge cooling channel 152 to less than 20% of the channel width (as determined by the lesser of third distance D3 and fourth distance D4), flow of cooling air F would be choked compared to the flow constriction created by adjacent pedestals in first row of pedestals 200. This would slow flow of cooling air F through first row of pedestals 200, thus reducing the heat transfer efficiency between surfaces to be cooled, pressure side wall 140 and suction side wall 142, and flow of cooling air F. Thus, some embodiments of the present invention have first distance D1 and second distance D2 each less than 40% of third distance D3 and 40% of fourth distance D4.

Conversely, in an embodiment where first distance D1 and second distance D2 extend such that together they narrow portions of trailing edge cooling channel 152 by only 10% of the channel width (again, as determined by the lesser of third distance D3 and fourth distance D4), the corresponding increases in surface area and velocity of flow of cooling air F would be negligible compared to a flat surface without contour bumps. Thus, some embodiments of the present invention have first distance D1 and second distance D2 each greater than 5% of third distance D3 and 5% of fourth distance D4. In some embodiments of the present invention, the first row of contour bumps 210 and second row of contour bumps 220 restrict flow of cooling air F between first row of pedestals 200 and second row of pedestals 202 to an extent less than either of first row of pedestals 200 or second row of pedestals 202.

Figure 6:
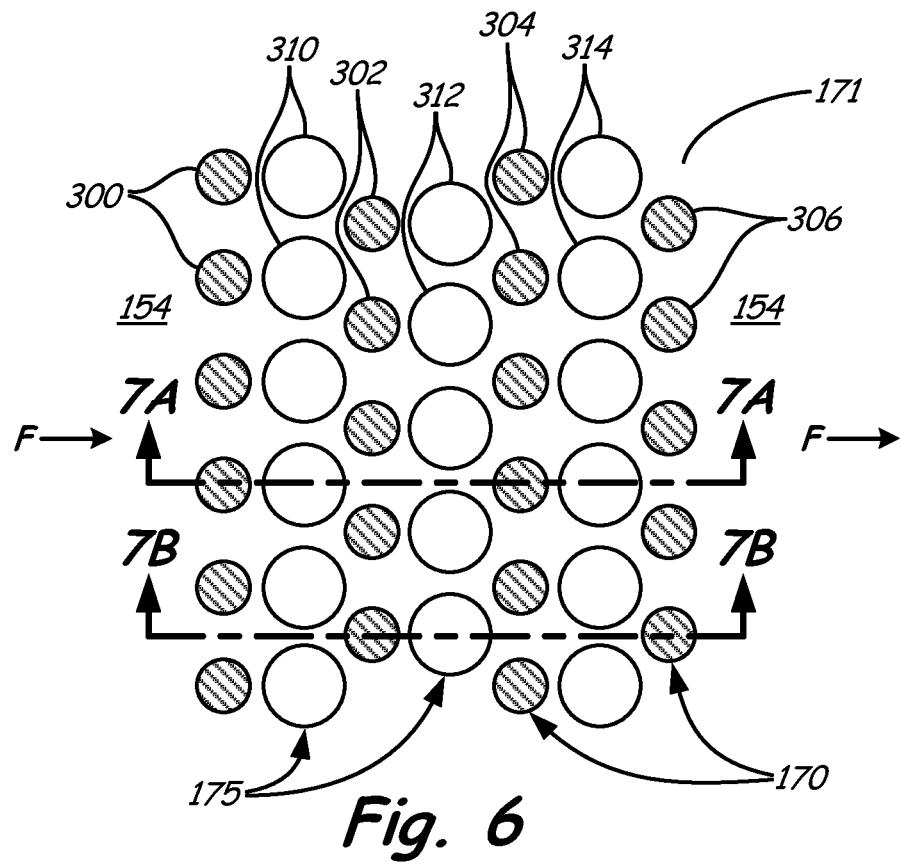
FIG. 6 is an enlarged cutaway side view of a portion of the turbine rotor blade of FIG. 3 illustrating another embodiment of improved cooling pedestal arrays of the present invention.

FIG. 6 is an enlarged cutaway side view of a portion of a rotor blade platform component, platform 38 of rotor blade 30 of FIG. 3 illustrating another embodiment of improved cooling pedestal arrays of the present invention. FIG. 6 shows first surface 171 to be cooled by flow of cooling air F flowing through platform cooling channel 154. First surface 171 includes rows of contour bumps 175 including first row of contour bumps 310. Pedestal array 170 includes first row of pedestals 300 and second row of pedestals 302. Second row of pedestals 302 runs in a direction generally parallel to first row of pedestals 300. First row of contour bumps 310 extends from first surface 171 between first row of pedestals 300 and second row of pedestals 302 and runs in a direction generally parallel to first row of pedestals 300. Second row of pedestals 302 is offset from first row of pedestals 300 in the parallel direction by one-half of a pitch of first row of pedestals 300. In this embodiment, first row of contour bumps 310 is offset from second row of pedestals 302 in the parallel direction by one-half of the pitch of second row of pedestals 302, such that at least one contour bump of first row of contour bumps 310 is positioned immediately downstream of a pedestal of first row of pedestals 300.

The pattern described above continues throughout pedestal array 170 such that additional rows of pedestals (e.g., 304, 306) run in a direction generally parallel to second row of pedestals 302 opposite first row of pedestals 300, each of the rows of pedestals offset from an adjacent row of pedestals by one-half of a pitch of the adjacent row of pedestals. Each additional row of contour bumps (e.g., 312, 314) runs between adjacent rows of pedestals and is aligned co-linear with a row of pedestals immediately upstream (e.g., 302, 304).

Figure 7A:
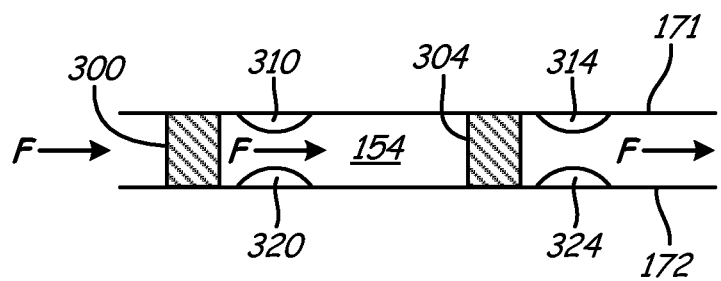
FIGS. 7A and 7B are side cross-sectional views of portions of the improved cooling pedestal array embodiment of FIG. 6.
Figure 7B:
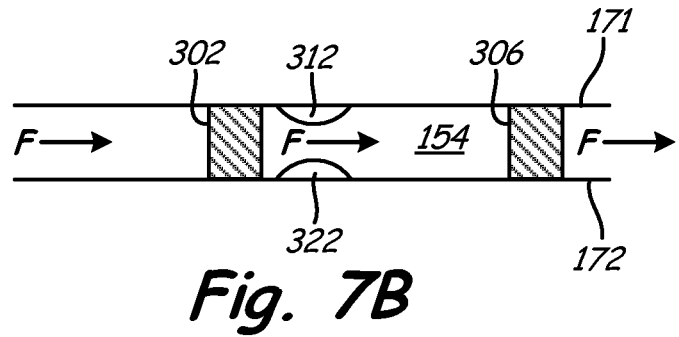

FIGS. 7A and 7B are side cross-sectional views of portions of the improved cooling pedestal array embodiment of FIG. 6. FIGS. 7A and 7B each illustrate an aspect of the pattern shown in FIG. 6. The sectional view of FIGS. 7A and 7B show first surface 171 is opposite second surface 172, forming platform cooling channel 154. Pedestals in pedestal array 170, including those in first row of pedestals 300 and second row of pedestals 302 extend from first surface 171 to second surface 172, connecting the two endwalls. As shown in FIG. 7A, second surface 172 includes second row of contour bumps 320. Second row of contour bumps 320 is also positioned directly across platform cooling channel 154 from first row of contour bumps 310.

In contrast to the embodiment described above in reference to FIGS. 4, 5A and 5B, in this embodiment, platform cooling channel 154 has a constant width. Thus, a distance each row of pedestals extends between first surface 171 and second surface 172 is approximately equal along the flow path. In this embodiment, a distance each row of contour bumps extends from first surface 171 or second surface 172 is also approximately equal along the flow path. This pattern continues down the line such that subsequent rows of pedestals (e.g., 304, 306) extend approximately the same distance across platform cooling channel 154 and subsequent rows of contour bumps (e.g. 312, 322, 314, 324) extend approximately the same distance into platform cooling channel 154.

Considering FIGS. 6, 7A, and 7B together, in operation, flow of cooling air F flows around and between each of the pedestals in first row of pedestals 300. The flow constriction created by adjacent pedestals in first row of pedestals 300 increases the velocity of flow of cooling air F. In addition, as flow of cooling air F recombines on a downstream side of each of the pedestals in first row of pedestals 300, turbulence is created. These two effects combine to increase the convective heat transfer coefficient. Once past first row of pedestals 300, flow of cooling air F flows around, between, and over first row of contour bumps 310 and second row of contour bumps 320. First row of contour bumps 310 and second row of contour bumps 320 increase surface areas of first surface 171 and second surface 172, respectively, in a region between first row of pedestals 300 and second row of pedestals 302. In addition, first row of contour bumps 310 and second row of contour bumps 320 decrease the cross-sectional area through which flow of cooling air F passes, resulting in a higher velocity of flow of cooling air F, compared to a flat surface without contour bumps, and a corresponding increase in the heat transfer coefficient. These two effects provided by first row of contour bumps 310 and second row of contour bumps 320 combine to increase the heat transfer efficiency between surfaces to be cooled, first surface 171 and second surface 172, and flow of cooling air F, compared to a flat surface without contour bumps.

Comparing the embodiment shown FIG. 4 with the embodiment shown FIG. 6 illustrates two alignment patterns of contour bumps with adjacent pedestals relative to the direction of flow of cooling air F. In the embodiment of FIG. 4, contour bumps are aligned to be in the center of the downstream channel to effectively provide a "blocking" effect to produce the increase in the velocity of cooling air flow F, in addition to the increase in heat transfer area. In the embodiment of FIG. 6, contour bumps are aligned to be immediately behind upstream pedestals to increase heat transfer in a separation zone that forms immediately downstream of the pedestals. Depending on design conditions, one pattern may be favored over the other, but both provide the advantages of increased heat transfer efficiency of the present invention.

In the embodiment shown in FIG. 4, the internal cooling channel, trailing edge cooling channel 152, does not have a constant width. Internal cooling channels may have this characteristic to increase the velocity of flow of cooling air F in a continuous fashion along the internal cooling channel, thus increasing the convective heat transfer coefficient and improving heat transfer efficiency. Embodiments of the present invention having internal cooling channels of constant width, such platform cooling channel 154 of the embodiment shown in FIG. 6, can employ rows of contour bumps that extend increasingly greater distances into the internal cooling channel, along the length of the internal cooling channel, to create a similar increase in the velocity of cooling air F in a continuous fashion along the internal cooling channel. This is particularly advantageous where a manufacturing process for a component is not able to create internal cooling channels that are not of constant width.

Figure 8:
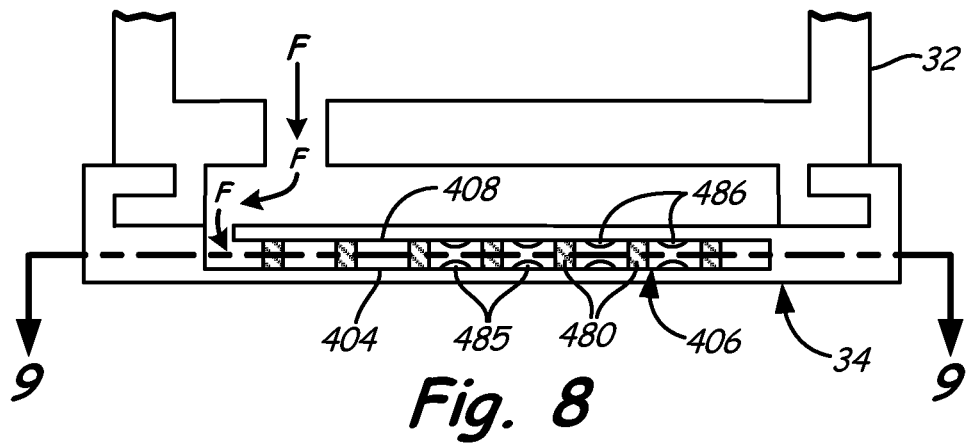
FIG. 8 is a side cross-sectional view of a blade outer air seal illustrating another embodiment of the present invention.

FIG. 8 is a side cross-sectional view of a blade outer air seal component, BOAS 34, illustrating another embodiment of the present invention. FIG. 8 shows BOAS 34 with an internal cooling channel having a pedestal array with contoured endwall surfaces embodying the present invention. FIG. 8 is cross sectional view of BOAS 34 and BOAS support 32. BOAS 34 is held in position by BOAS support 32, as shown above in FIG. 2. BOAS 34 includes internal cooling channel 406. Internal cooling channel 406 includes pedestal array 480. Internal cooling channel 406 extends most of the width of BOAS 34. Edge cooling holes (not shown) on sides of BOAS 34 are in fluid communication with internal cooling channel 406.

BOAS 34 is cooled by flow of cooling air F entering internal cooling channel 406 on one end of internal cooling channel 406 from a plenum (not shown) radially outward from BOAS support 32 by way of an opening in BOAS support 32. Within internal cooling channel 406, flow of cooling air F impinges on pedestal array 480. Pedestals of pedestal array 480 extend from a first surface 404 to be cooled to a second surface 408 to be cooled. First surface 404 is opposite second surface 408 to form internal cooling channel 406 within BOAS 34. FIG. 8 also shows that internal cooling channel 406 in a portion of a region of pedestal array 480 includes rows of contour bumps 485 on first surface 404 and rows of contour bumps 486 on second surface 408 opposite first surface 404.

As with the embodiment described above in reference to FIGS. 6, 7A and 7B, in this embodiment, internal cooling channel 406 has a constant width. Thus, a distance pedestals of pedestal array 480 extend between first surface 404 and second surface 408 is approximately equal along the flow path. In this embodiment, a distance each row of contour bumps extends from first surface 404 or second surface 408 is also approximately equal along the flow path. As also shown in FIG. 8, rows of contour bumps 485 are positioned directly across internal cooling channel 406 from rows of contour bumps 486.

Figure 9:
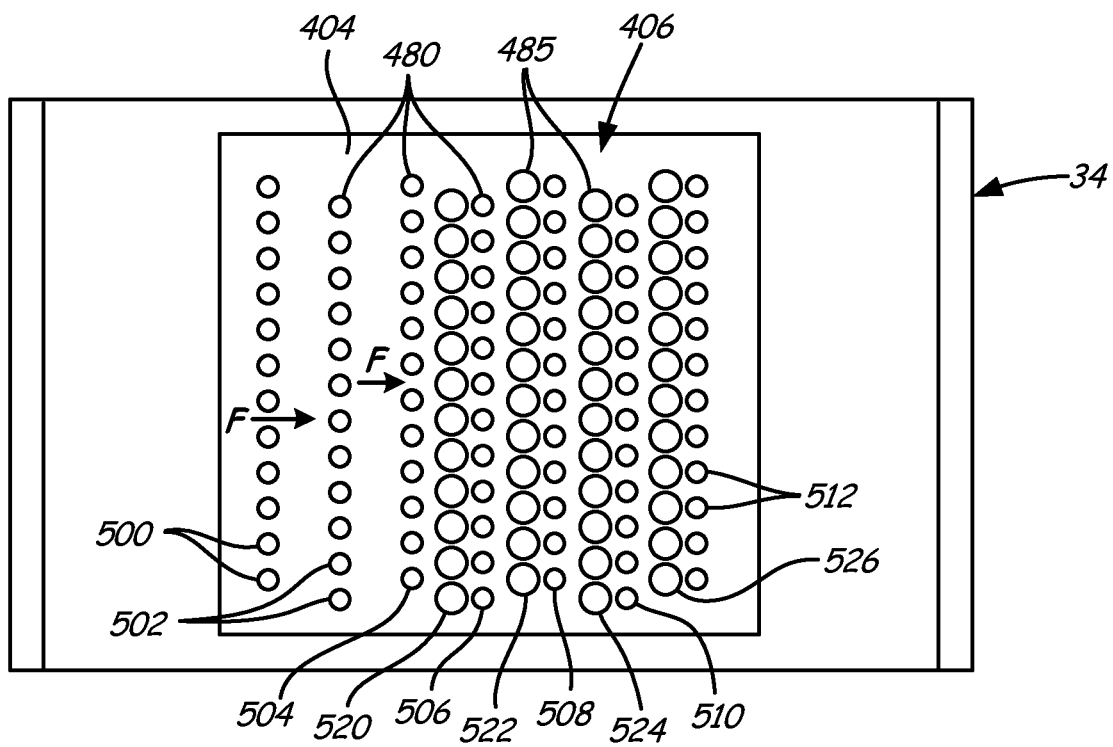
FIG. 9 is a top cross-sectional view of the blade outer air seal of FIG. 8.

FIG. 9 is a top cross-sectional view of BOAS 34 of FIG. 8. FIG. 9 shows first surface 404 to be cooled by flow of cooling air F flowing through internal cooling channel 406. First surface 404 includes rows of contour bumps 485 including first row of contour bumps 520. Pedestal array 480 includes first row of pedestals 504 and second row of pedestals 506. Second row of pedestals 506 runs in a direction generally parallel to first row of pedestals 504. First row of contour bumps 520 extends from first surface 404 between first row of pedestals 504 and second row of pedestals 506 and runs in a direction generally parallel to first row of pedestals 504. Second row of pedestals 506 is offset from first row of pedestals 504 in the parallel direction by one-half of a pitch of first row of pedestals 504. In this embodiment, first row of contour bumps 520 is offset from first row of pedestals 504 in the parallel direction by one-half of the pitch of first row of pedestals 504, such that at least one contour bump of first row of contour bumps 520 is positioned immediately upstream from a pedestal of second row of pedestals 506.

The pattern described above continues throughout pedestal array 480 downstream of second row of pedestals 506 such that additional rows of pedestals (e.g., 508, 510, 512) run in a direction generally parallel to second row of pedestals 506 opposite first row of pedestals 504, each of the rows of pedestals offset from an adjacent row of pedestals by one-half of a pitch of the adjacent row of pedestals. Each additional row of contour bumps (e.g., 522, 524, 526) runs between adjacent rows of pedestals and is aligned co-linear with a row of pedestals immediately downstream (e.g., 508, 510, 512). This pattern also applies to rows of contour bumps 486 on second surface 408 opposite first surface 404 corresponding to rows of contour bumps 485 on first surface 404.

Pedestal arrays without the advantages of the present invention exhibit a strong increase in heat transfer efficiency in the first three rows of pedestals. After the third row, heat transfer efficiency levels off and may drop off slightly. The embodiment shown in FIG. 9 solves this problem. Pedestal array 480 includes a plurality of rows of pedestals, row of pedestals 500 and row of pedestals 502, running in a direction generally parallel to first row of pedestals 504, on a side of first row of pedestals 504 opposite second row of pedestals 506. In this embodiment, rows of contour bumps 485 are not disposed upstream of first row of pedestals 504. As with the rest of pedestal array 480, each of the rows of pedestals (500, 502) is offset from an adjacent row of pedestals (502, 504) by one-half of the pitch of the adjacent row of pedestals. This embodiment experiences the strong increase in heat transfer efficiency in the first three rows of pedestals (500, 502, 504), then employs contoured endwalls to counter the drop off in heat transfer efficiency often suffered by pedestal arrays without contoured endwalls.

Considering FIGS. 8 and 9 together, in operation, flow of cooling air F flows around and between each of the pedestals in the first three rows of pedestal array 480, row of pedestals 500, row of pedestals 502, and first row of pedestals 504, experiencing a strong increase in heat transfer efficiency. Once past first row of pedestals 504, flow of cooling air F flows around, between, and over rows of contour bumps 485 on first surface 404 and rows of contour bumps 486 on second surface 408 which increase surface areas of first surface 404 and second surface 408. In addition, rows of contour bumps 485 and rows of contour bumps 486 decrease the cross-sectional area through which flow of cooling air F passes, resulting in a higher velocity of flow of cooling air F, compared to a flat surface without contour bumps, and a corresponding increase in the heat transfer coefficient. These two effects provided by rows of contour bumps 485 and rows of contour bumps 486 combine to increase the heat transfer efficiency between surfaces to be cooled, first surface 404 and second surface 408, and flow of cooling air F, compared to a flat surface without contour bumps.

In embodiments described above, rows of contour bumps on a first surface correspond to rows of contour bumps on a second surface across an internal cooling channel from the first surface. However, it is understood that the present invention includes embodiments where rows of contour bumps on a first surface correspond to the pattern shown in FIG. 4, while rows of contour bumps on a second surface correspond to the pattern shown in FIG. 6. Thus, the contour bumps on the first surface align with pedestals immediately downstream of the contour bumps and the contour bumps on the second surface align with pedestals immediately upstream of the contour bumps.

For convenience, in all of the embodiments described above, contour bumps are illustrated as spherical domes. However, it is understood that the present invention also encompasses embodiments where the contour bumps are other three-dimensional shapes that can be used to reduce any pressure loss created by the contour bumps, while improving heat transfer efficiency. Such shapes include, for example, an ellipsoidal dome, a tear drop, or a bulb tapered at both ends, as illustrated in the embodiment described below in reference to FIGS. 10, 11, 12A, and 12B.

Figure 10:
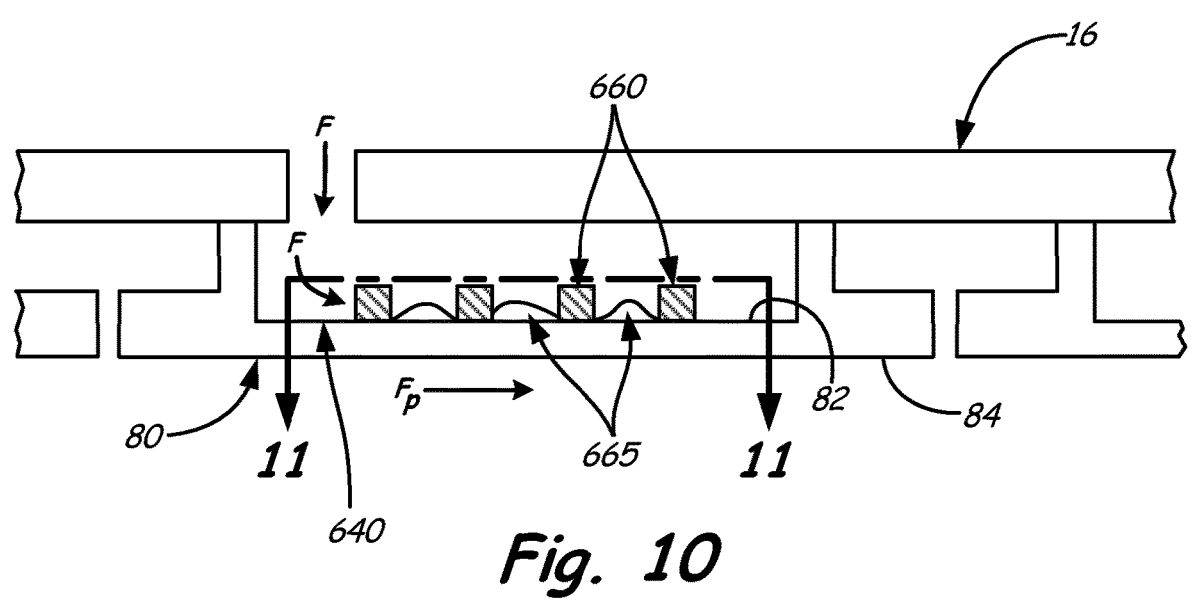
FIG. 10 is a side cross-sectional view of a combustor liner panel embodying improved cooling pedestal arrays of the present invention.

FIG. 10 is a side cross-sectional view of a combustor liner panel embodying improved cooling pedestal arrays of the present invention. Combustors may include combustor liner panels to protect the combustor from the heat of combustion within. FIG. 10 shows combustor 16 of FIG. 1 includes combustor liner panel 80 attached to combustor 16 by, for example, bolts (not shown). In contrast to the embodiments described above, combustor liner panel 80 has only a single surface to be cooled. As shown in FIG. 10, combustor liner panel 80 includes first surface 82 to be cooled and combustion surface 84. First surface 82 is opposite combustor 16 to form internal cooling channel 640 within combustor liner panel 80. Internal cooling channel 640 extends most of the length of combustor liner panel 80. Internal cooling channel 640 includes pedestals pedestal array 660 and rows of contour bumps 665. Pedestals of pedestal array 660 and rows of contour bumps 665 extend from first surface 82. Film cooling holes (not shown) on combustion surface 84 are in fluid communication with internal cooling channel 640.

Combustor liner panel 80 is cooled by flow of cooling air F entering internal cooling channel 640 on one end of internal cooling channel 640 from a plenum (not shown) radially outward from combustor 16 by way of an opening in combustor 16. Within internal cooling channel 640, flow of cooling air F impinges on pedestal array 660. Cooling air F flows through and over pedestal array 660 and rows of contour bumps 665 and out through the film cooling holes on combustion surface 84. In this way, heat from combustion gases Fp conducted from combustion surface 84 to first surface 82 is removed by flow of cooling air F through internal cooling channel 640. Pedestal array 660 and rows of contour bumps 665 combine to increase the heat transfer efficiency between first surface 82 and flow of cooling air F, compared to a flat surface without contour bumps.

Figure 11:
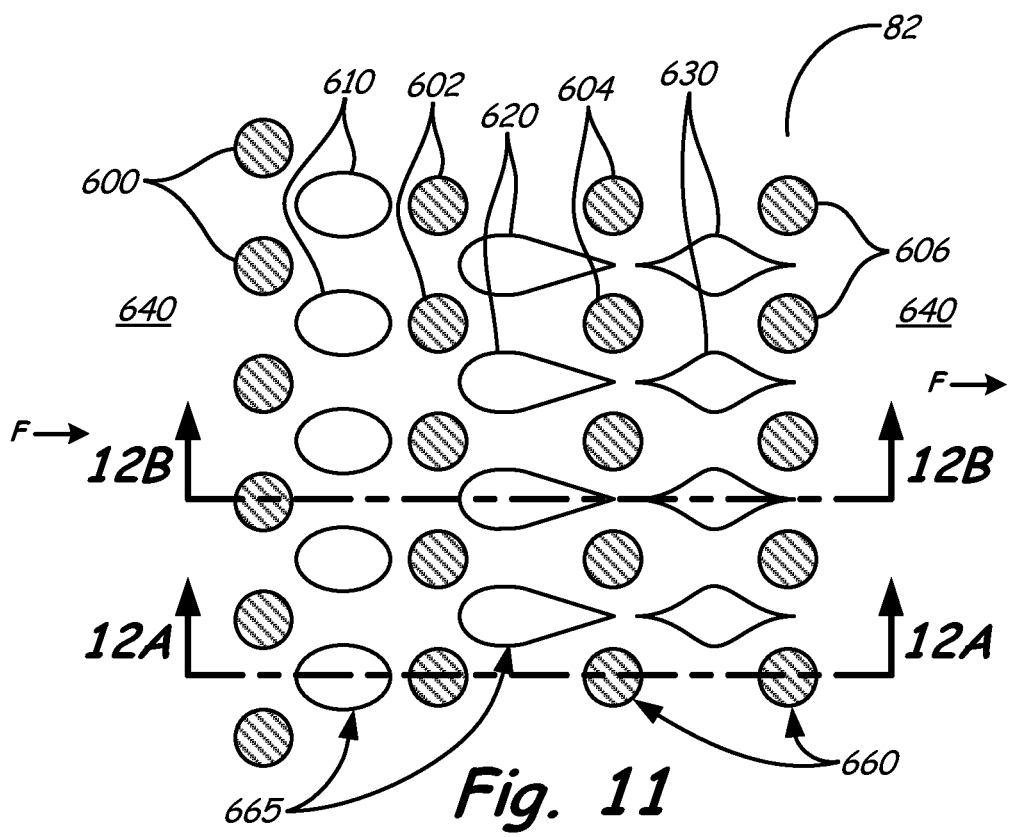
FIG. 11 is top cross-sectional side view of a portion of the combustor liner panel of FIG. 10 illustrating an embodiment of improved cooling pedestal arrays of the present invention.

FIG. 11 is top cross-sectional side view of a portion of combustor liner panel 80 of FIG. 10. FIG. 11 shows first surface 82 to be cooled by flow of cooling air F flowing through internal cooling channel 640. First surface 82 includes rows of contour bumps 665 including first row of contour bumps 610, second row of contour bumps 620, and third row of contour bumps 630. Pedestal array 660 includes first row of pedestals 600, second row of pedestals 602, third row of pedestals 604, and fourth row of pedestals 606. Second row of pedestals 602 runs in a direction generally parallel to first row of pedestals 600. First row of contour bumps 610 extends from first surface 82 between first row of pedestals 600 and second row of pedestals 602 and runs in a direction generally parallel to first row of pedestals 600.

Second row of pedestals 602 is offset from first row of pedestals 600 in the parallel direction by one-half of a pitch of first row of pedestals 600. In this embodiment, first row of contour bumps 610 is offset from first row of pedestals 600 in the parallel direction by one-half of the pitch of first row of pedestals 600, such that at least one contour bump of first row of contour bumps 610 is positioned immediately upstream of a pedestal of row of pedestals 602.

In contrast to previous embodiments, in the embodiment shown in FIG. 11, the pattern described does not continue throughout pedestal array 660. Downstream of second row of pedestals 602 additional rows of pedestals (e.g., 604, 606) run in a direction generally parallel to second row of pedestals 602 opposite first row of pedestals 600 and each of the rows of pedestals is aligned with an adjacent row of pedestals. In addition, each additional row of contour bumps (e.g., 620, 630) runs between adjacent rows of pedestals and is offset from an adjacent row of pedestals by one-half pitch of the adjacent row of pedestals. Thus, while first row of contour bumps 610 is aligned to be in the center of the upstream channel, relative to second row of pedestals 602 to effectively provide a "blocking" effect, second row of contour bumps 620 and third row of contour bumps 630 provide a blocking effect for both upstream and downstream channels, relative to adjacent rows of pedestals (e.g. 604).

Figure 12A:
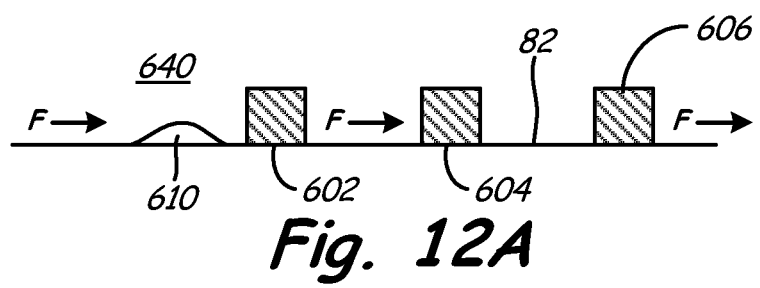
FIGS. 12A and 12B are side cross-sectional views of portions of the improved cooling pedestal array embodiment of FIG. 11.
Figure 12B:
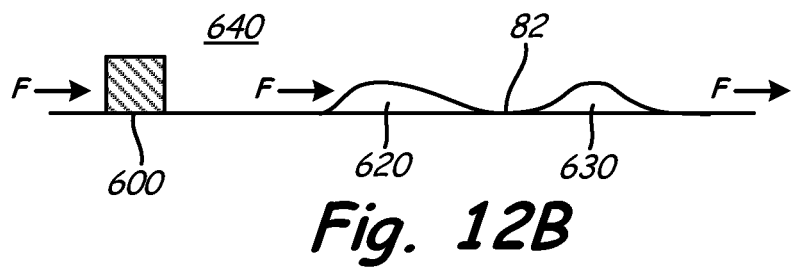

FIGS. 12A and 12B are side cross-sectional views of portions of the improved cooling pedestal array embodiment of FIG. 11. FIGS. 12A and 12B each illustrate an aspect of the pattern shown in FIG. 11. The sectional view of FIGS. 12A and 12B show pedestals in pedestal array 600 extend from a single endwall, first surface 82.

Considering FIGS. 10, 11, 12A, and 12B together, each row of contour bumps of rows of contour bumps 665 includes contour bumps having a different shape. Contour bumps in first row of contour bumps 610 have an ellipsoidal dome shape and the longest axis is aligned with the direction of flow of cooling air F. Contour bumps in second row of contour bumps 620 have a tear drop shape. The contour bumps in second row of contour bumps 620 have an axis from a tapered end to a bulbous end, and are aligned such that the axis is aligned with the direction of flow of cooling air F and the bulbous end is facing upstream. Finally, contour bumps in third row of contour bumps 630 have a bulb shape that is tapered at both ends of the bulb. The contour bumps in third row of contour bumps 630 have an axis between the tapered ends and are aligned such that the axis is aligned with the direction of flow of cooling air F.

The present invention has been described in detail with respect to a rotor blade airfoil, a rotor blade platform, a blade outer air seal, and a combustor liner panel. However, it is understood that the present invention encompasses embodiments within other components of a gas turbine engine, such as a stator vane airfoil, a stator vane outside diameter platform, a stator vane inside diameter platform, an augmenter liner panel, and a nozzle liner panel.

A method for cooling a surface within an internal cooling channel begins with introducing cooling air into a pedestal array on the surface to be cooled. Then flowing the cooling air between adjacent pedestals of a first row of pedestals attached to the surface. Next, flowing the cooling air over and between adjacent contour bumps of a row of contour bumps beyond the first row of pedestals. Finally, flowing the cooling air between adjacent pedestals of a second row of pedestals attached to the surface beyond the row of contour bumps. Flowing the cooling air over and between adjacent contour bumps includes at least one of increasing heat transfer in a separation zone by flowing cooling air over contour bumps aligned immediately downstream of the first row of pedestals and compensating for a lack of blocking downstream channel region by flowing cooling air over contour bumps aligned immediately upstream of a pedestal of the second row of pedestals.

All embodiments described above are illustrated with pedestals having a circular cross-section. However, it is understood that the present invention encompasses embodiments with pedestals having other shapes, for example, oval, elliptical, tear drop, triangular, or square. In addition, the present invention encompasses embodiments where the pedestals connect with a single wall, as in the embodiment described above in reference to FIGS. 10, 11, 12A and 12B, but are completely within a component, as in the embodiment described above in reference to FIGS. 6, 7A, and 7B.

The present invention employs cooling channels having pedestal arrays with contoured endwall surfaces to provide for improved heat transfer efficiency between turbine engine components exposed to a flow of combustion gases and a flow of cooling air. Rows of contour bumps are disposed between rows of pedestals on the endwall surface. The contour bumps improve heat transfer efficiency when compared to a flat surface by increasing the surface area available for heat transfer and by forcing an increase in the velocity of cooling air passing over the surface between pedestal rows, thus increasing the convective heat transfer coefficient. In some embodiments, positioning contour bumps immediately downstream of pedestals increases heat transfer in the separation zone. In some embodiments, positioning contour bumps downstream and in the channel between pedestals compensates for a lack of blocking in the downstream channel. Contour bumps of various shapes may be employed in some embodiments to further enhance heat transfer efficiency.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A turbine engine airfoil can include a first surface to be cooled by a flow of cooling air, the first surface including a pedestal array physically connected to the first surface, the pedestal array including a first row of pedestals extending from the first surface; and a second row of pedestals extending from the first surface and running in a direction generally parallel to the first row of pedestals; and a first row of contour bumps extending from the first surface between the first row of pedestals and the second row of pedestals and running in a direction generally parallel to the first row of pedestals, the first row of contour bumps aligned such that at least one contour bump of the first row of contour bumps is positioned immediately downstream of a pedestal of the first row of pedestals such that the at least one contour bump of the first row of contour bumps is aligned co-linear with the pedestal of the first row of pedestals in a direction parallel to the downstream direction of the flow of cooling air.

The airfoil of the preceding paragraph can optionally include, additionally and/or alternatively, any one or more of the following features, configurations and/or additional components:

the first row of contour bumps can be aligned such that each contour bump of the first row of contour bumps can be positioned immediately downstream of a pedestal of the first row of pedestals such that each contour bump of the first row of contour bumps can be aligned co-linear with the pedestal of the first row of pedestals in a direction parallel to the downstream direction of the flow of cooling air;

the first row of contour bumps can extend a first distance from the first surface, the first row of pedestals extends a second distance from the first surface; the second row of pedestals extends a third distance from the first surface, and the first distance is less than 40% and more than 5% of the second distance and the third distance;

the first row of contour bumps can restrict the flow of cooling air between the first row of pedestals and the second row of pedestals to an extent that can be less than the first row of pedestals and the second row of pedestals restrict the flow of cooling air;

the second row of pedestals can be offset from the first row of pedestals in the parallel direction;

contour bumps of the first row of contour bumps can have a shape that is one of a spherical dome, an ellipsoidal dome, a tear drop, and/or a bulb tapered at both ends;

the airfoil can comprise a rotor blade;

the pedestal array can further include a plurality of rows of pedestals can extend from the first surface and running in a direction parallel to the second row of pedestals on a side of the second row of pedestals opposite the first row of pedestals; each of the plurality of rows of pedestals can extend from the first surface one or more distances; and the first surface further can include a plurality of rows of contour bumps, at least one of the plurality of rows of contour bumps can extend from the first surface between adjacent rows of pedestals and running in a direction generally parallel to the adjacent rows of pedestals; at least one of the plurality of rows of contour bumps can extend from the first surface less than 40% and more than 5% of the distance both adjacent rows of pedestals extend from the first surface;

the pedestal array can further include a plurality of rows of pedestals running in a direction parallel to the first row of pedestals; wherein the plurality of rows of pedestals can run on a side of the first row of pedestals opposite the second row of pedestals;

the airfoil can further include a second surface to be cooled by the flow of cooling air; the second surface opposite the first surface such that the first row of pedestals and the second row of pedestals can each extend to the second surface to create a flow passage between the first surface and the second surface; the second surface can include a second row of contour bumps extending from the second surface between the first row of pedestals and the second row of pedestals and running in a direction generally parallel to the first row of pedestals; the second row of contour bumps can be aligned such that at least one contour bump of the second row of contour bumps is positioned at least one of immediately downstream of a pedestal of the first row of pedestals and immediately upstream of a pedestal of the second row of pedestals;

the first row of contour bumps can extend a first distance from the first surface, the second row of contour bumps can extend a second distance from the second surface, the first row of pedestals can extend a third distance from the first surface; the second row of pedestals can extend a forth distance from the first surface; and the first distance and the second distance are each less than 40% and more than 5% of the third distance and the fourth distance;

the first row of contour bumps and the second row of contour bumps together can restrict the flow of cooling air between the first row of pedestals and the second row of pedestals to an extent less than the first row of pedestals and the second row of pedestals restrict the flow of cooling air;

the first row of contour bumps can be aligned such that at least one contour bump of the first row of contour bumps can be positioned immediately downstream of a pedestal of the first row of pedestals; and the second row of contour bumps can be aligned such that at least one contour bump of the second row of contour bumps can be positioned immediately upstream of a pedestal of the second row of pedestals;

the pedestal array can further include a plurality of rows of pedestals extending from the first surface and running in a direction parallel to the second row of pedestals on a side of the second row of pedestals opposite the first row of pedestals; each of the plurality of rows of pedestals can extend from the first surface one or more distances to the second surface; the first surface can further include a first plurality of rows of contour bumps, at least one of the first plurality of rows of contour bumps can extend from the first surface between adjacent rows of pedestals and running in a direction generally parallel to the adjacent rows of pedestals; at least one of the first plurality of rows of contour bumps can extend from the first surface less than 40% and more than 5% of the distance both adjacent rows of pedestals extend from the first surface to the second surface; and the second surface further includes a second plurality of rows of contour bumps, at least one of the second plurality of rows of contour bumps can extend from the second surface between adjacent rows of pedestals and running in a direction generally parallel to the adjacent rows of pedestals; at least one of the second plurality of rows of contour bumps can extend from the second surface less than 40% and more than 5% of the distance both adjacent rows of pedestals extend from the first surface to the second surface; and contour bumps of the first row of contour bumps and contour bumps of the second row of contour bumps can have a shape that is one of a spherical dome, an ellipsoidal dome, a tear drop, and/or a bulb tapered at both ends.

A gas turbine engine can include a combustor; a turbine can include a plurality of rotor stages; and a plurality of stator stages can be interspersed between the plurality of rotor stages; and an airfoil to be cooled within at least one of the combustor and the turbine, the airfoil can include a first surface to be cooled by a flow of cooling air, the first surface can include a pedestal array physically connected to the first surface, the pedestal array can include a first row of pedestals extending from the first surface; and a second row of pedestals can extend from the first surface and running in a direction generally parallel to the first row of pedestals; and a first row of contour bumps can extend from the first surface between the first row of pedestals and the second row of pedestals and running in a direction generally parallel to the first row of pedestals, the first row of contour bumps aligned such that at least one contour bump of the first row of contour bumps can be positioned immediately downstream of a pedestal of the first row of pedestals such that the at least one contour bump of the first row of contour bumps can be aligned co-linear with the pedestal of the first row of pedestals in a direction parallel to a direction towards the downstream side of first row of pedestals.

The airfoil of the preceding paragraph can optionally include, additionally and/or alternatively, any one or more of the following features, configurations and/or additional components:

the first row of contour bumps can be aligned such that each contour bump of the first row of contour bumps can be positioned immediately downstream of a pedestal of the first row of pedestals such that each contour bump of the first row of contour bumps can be aligned co-linear with the pedestal of the first row of pedestals in a direction parallel to a direction towards the downstream side of first row of pedestals;

at least one of the plurality of stator stages can include a plurality of stator vanes, each stator vane can include an inner diameter platform having radially inward facing surface and radially outward facing surface; an outer diameter platform having an radially inward facing surface and a radially outward facing surface; and an airfoil extending radially between the radially outward facing surface of the inner diameter platform and the radially inward facing surface of the outer diameter platform; wherein the airfoil to be cooled within the turbine is at least one of the outer diameter platform, the inner diameter platform, and the airfoil; and the airfoil can comprise a rotor blade.

A method for cooling a surface within an internal cooling channel of an airfoil can include introducing cooling air into a pedestal array on the surface to be cooled; flowing the cooling air between adjacent pedestals of a first row of pedestals attached to the surface; flowing the cooling air over and between adjacent contour bumps of a row of contour bumps beyond the first row of pedestals; and flowing the cooling air between adjacent pedestals of a second row of pedestals attached to the surface beyond the row of contour bumps, wherein flowing the cooling air over and between adjacent contour bumps can comprise increasing heat transfer in a separation zone by flowing cooling air over contour bumps aligned immediately downstream of the first row of pedestals, wherein the contour bumps can be aligned co-linear with the first row of pedestals in a direction parallel to the downstream direction of the flow of cooling air.

The invention claimed is:

1. A blade outer air seal of a turbine engine, the blade outer air seal comprising:
   a first surface to be cooled by a flow of cooling air, wherein the flow of cooling air includes a downstream direction, the first surface including:
      a pedestal array physically connected to the first surface, the pedestal array including:
         a first row of pedestals extending from the first surface; and
         a second row of pedestals extending from the first surface and running in a direction generally parallel to the first row of pedestals; and
      a first row of contour bumps extending from the first surface between the first row of pedestals and the second row of pedestals and running in a direction generally parallel to the first row of pedestals, wherein the first row of contour bumps is positioned adjacent to and immediately upstream from the second row of pedestals, wherein the first row of contour humps is positioned adjacent to and immediately downstream from the first row of pedestals such that there are no other rows of contour bumps positioned between the first row of pedestals and the first row of contour bumps, the first row of contour bumps aligned such that each contour bump of the first row of contour bumps is positioned immediately downstream of a pedestal of the first row of pedestals such that each contour bump of the first row of contour bumps is aligned co-linear with the pedestal of the first row of pedestals in a direction parallel to the downstream direction of the flow of cooling air, and
   a second surface opposite the first surface such that the first row of pedestals and the second row of pedestals each extend to the second surface,
   wherein each contour bump of the first row of contour humps does not extend to the second surface.

2. The blade outer air seal of claim 1 further wherein the first row of contour bumps is aligned such that each contour bump of the first row of contour bumps is positioned immediately downstream of a pedestal of the first row of pedestals such that each contour bump of the first row of contour bumps is aligned co-linear with the pedestal of the first row of pedestals in a direction parallel to the downstream direction of the flow of cooling air.

3. The blade outer air seal of claim 1, wherein the first row of contour bumps extends a first distance from the first surface, the first row of pedestals extends a second distance from the first surface, the second row of pedestals extends a third distance from the first surface, and the first distance is less than 40% and more than 5% of the second distance and the third distance.

4. The blade outer air seal of claim 1, wherein the first row of contour bumps restricts the flow of cooling air between the first row of pedestals and the second row of pedestals to an extent less than the first row of pedestals and the second row of pedestals restrict the flow of cooling air.

5. The blade outer air seal of claim 1, wherein the second row of pedestals is offset from the first row of pedestals in the parallel direction.

6. The blade outer air seal of claim 1, wherein contour bumps of the first row of contour bumps have a shape that is one of a spherical dome, an ellipsoidal dome, a tear drop, and a bulb tapered at both ends.

7. The blade outer air seal of claim 1, wherein,
   the pedestal array further comprises:
      a plurality of rows of pedestals extending from the first surface and running in a direction parallel to the second row of pedestals on a side of the second row of pedestals opposite the first row of pedestals, each of the plurality of rows of pedestals extending from the first surface one or more distances; and
   the first surface further comprises:
      a plurality of rows of contour bumps, at least one of the plurality of rows of contour bumps extending from the first surface between adjacent rows of pedestals and running in a direction generally parallel to the adjacent rows of pedestals, at least one of the plurality of rows of contour bumps extending from the first surface less than 40% and more than 5% of the distance both adjacent rows of pedestals extend from the first surface.

8. The blade outer air seal of claim 7, wherein the pedestal array further comprises:
   a plurality of rows of pedestals running in a direction parallel to the first row of pedestals;
   wherein the plurality of rows of pedestals runs on a side of the first row of pedestals opposite the second row of pedestals.

9. The blade outer air seal of claim 1, further comprising:
   the second surface to be cooled by the flow of cooling air, the first row of pedestals and the second row of pedestals each extend to the second surface to create a flow passage between the first surface and the second surface, the second surface including:
      a second row of contour bumps extending from the second surface between the first row of pedestals and the second row of pedestals and running in a direction generally parallel to the first row of pedestals, the second row of contour bumps aligned such that at least one contour bump of the second row of contour bumps is positioned at least one of immediately downstream of a pedestal of the first row of pedestals and immediately upstream of a pedestal of the second row of pedestals.

10. The blade outer air seal of claim 9, wherein the first row of contour bumps extends a first distance from the first surface, the second row of contour bumps extends a second distance from the second surface, the first row of pedestals extends a third distance from the first surface, the second row of pedestals extends a forth distance from the first surface, and the first distance and the second distance are each less than 40% and more than 5% of the third distance and the fourth distance.

11. The blade outer air seal of claim 9, wherein the first row of contour bumps and the second row of contour bumps together restrict the flow of cooling air between the first row of pedestals and the second row of pedestals to an extent less than the first row of pedestals and the second row of pedestals restrict the flow of cooling air.

12. The blade outer air seal of claim 9, wherein the first row of contour bumps is aligned such that at least one contour bump of the first row of contour bumps is positioned immediately downstream of a pedestal of the first row of pedestals, and the second row of contour bumps is aligned such that at least one contour bump of the second row of contour bumps is positioned immediately upstream of a pedestal of the second row of pedestals.

13. The blade outer air seal of claim 9, wherein,
the pedestal array further comprises:
a plurality of rows of pedestals extending from the first surface and running in a direction parallel to the second row of pedestals on a side of the second row of pedestals opposite the first row of pedestals, each of the plurality of rows of pedestals extending from the first surface one or more distances to the second surface;
the first surface further comprises:
a first plurality of rows of contour bumps, at least one of the first plurality of rows of contour bumps extending from the first surface between adjacent rows of pedestals and running in a direction generally parallel to the adjacent rows of pedestals, at least one of the first plurality of rows of contour bumps extending from the first surface less than 40% and more than 5% of the distance both adjacent rows of pedestals extend from the first surface to the second surface; and
the second surface further comprises:
a second plurality of rows of contour bumps, at least one of the second plurality of rows of contour bumps extending from the second surface between adjacent rows of pedestals and running in a direction generally parallel to the adjacent rows of pedestals, at least one of the second plurality of rows of contour bumps extending from the second surface less than 40% and more than 5% of the distance both adjacent rows of pedestals extend from the first surface to the second surface.

14. The blade outer air seal of claim 9, wherein contour bumps of the first row of contour bumps and contour bumps of the second row of contour bumps have a shape that is one of a spherical dome, an ellipsoidal dome, a tear drop, and a bulb tapered at both ends.

15. A gas turbine engine comprising:
a combustor;
a turbine including:
a plurality of rotor stages; and
a plurality of stator stages interspersed between the plurality of rotor stages; and
a blade outer air seal to be cooled within the turbine, the blade outer air seal comprising:
a first surface to be cooled by a flow of cooling air, the first surface including:
a pedestal array physically connected to the first surface, the pedestal array including:
a first row of pedestals extending from the first surface; and
a second row of pedestals extending from the first surface and running in a direction generally parallel to the first row of pedestals; and
a first row of contour humps extending from the first surface between the first row of pedestals and the second row of pedestals and running in a direction generally parallel to the first row of pedestals, wherein the first row of contour bumps is positioned adjacent to and immediately upstream from the second row of pedestals, wherein the first row of contour bumps is positioned adjacent to and immediately downstream from the first row of pedestals such that there are no other rows of contour humps positioned between the first row of pedestals and the first row of contour bumps, the first row of contour bumps aligned such that each contour bump of the first row of contour bumps is positioned immediately downstream of a pedestal of the first row of pedestals such that each contour bump of the first row of contour bumps is aligned co-linear with the pedestal of the first row of pedestals in a direction parallel to a direction towards the downstream side of the first row of pedestals, and
a second surface opposite the first surface such that the first row of pedestals and the second row of pedestals each extend to the second surface,
wherein each contour bump of the first row of contour bumps does not extend to the second surface.

16. The gas turbine engine of claim 15 further wherein the first row of contour bumps is aligned such that each contour bump of the first row of contour bumps is positioned immediately downstream of a pedestal of the first row of pedestals such that each contour bump of the first row of contour bumps is aligned co-linear with the pedestal of the first row of pedestals in a direction parallel to a direction towards the downstream side of the first row of pedestals.

17. The gas turbine engine of claim 15, wherein at least one of the plurality of stator stages comprises:
a plurality of stator vanes, each stator vane including:
an inner diameter platform having radially inward facing surface and radially outward facing surface;
an outer diameter platform having an radially inward facing surface and a radially outward facing surface; and
an airfoil extending radially between the radially outward facing surface of the inner diameter platform and the radially inward facing surface of the outer diameter platform.

18. A method for cooling a first and second surface within an internal cooling channel of a blade outer air seal, the method comprising:
introducing cooling air into a pedestal array on the surface to be cooled, wherein the cooling air includes a downstream direction of flow, flowing the cooling air between adjacent pedestals of a first row of pedestals attached to the first surface;

flowing the cooling air over and between adjacent contour bumps of a first row of contour bumps beyond the first row of pedestals, wherein the first row of contour bumps is positioned adjacent to and immediately downstream from the first row of pedestals such that there are no other rows of contour bumps positioned between the first row of pedestals and the first row of contour bumps; and flowing the cooling air between adjacent pedestals of a second row of pedestals attached to the first surface beyond the first row of contour bumps, wherein flowing the cooling air over and between adjacent contour bumps comprises increasing heat transfer in a separation zone by flowing cooling air over the contour bumps of the first row of contour bumps, the first row of contour bumps aligned such that each contour bump of the first row of contour bumps is positioned immediately downstream of a pedestal of the first row of pedestals such that each contour bump of the first row of contour bumps is aligned co-linear with the pedestal of the first row of pedestals in a direction parallel to the downstream direction of the flow of cooling air, and the second surface being opposite of the first surface such that the first row of pedestals and the second row of pedestals each extend to the second surface, wherein each contour bump of the first row of contour bumps does not extend to the second surface.

\* \* \* \* \*

UNITED STATES PATENT AND TRADEMARK OFFICE
CERTIFICATE OF CORRECTION

PATENT NO. : 10,513,932 B2
APPLICATION NO. : 15/200063
DATED : December 24, 2019
INVENTOR(S) : Mark F. Zelesky and Eleanor D. Kaufman It is certified that error appears in the above-identified patent and that said Letters Patent is hereby corrected as shown below:

In the Claims

Column 17, Line 55 Claim 1:
Delete "humps"
Insert --bumps--

Column 18, Line 5 Claim 1:
Delete "humps"
Insert --bumps--

Column 20, Line 17 Claim 15:
Delete "humps"
Insert --bumps--

Column 20, Line 26 Claim 15:
Delete "humps"
Insert --bumps--

Signed and Sealed this
Twenty-eighth Day of January, 2020

Andrei Iancu
*Director of the United States Patent and Trademark Office*